Patented June 3, 1930

1,761,936

UNITED STATES PATENT OFFICE

ALFRED W. SCHLUCHTER, OF DEARBORN, MICHIGAN, ASSIGNOR TO GENERAL MOTORS RESEARCH CORPORATION, OF DETROIT, MICHIGAN, A CORPORATION OF DELAWARE

METHOD OF RUST-PROOFING IRON OR STEEL

No Drawing.    Application filed December 24, 1928.    Serial No. 328,315.

This invention relates to processes for applying a corrosion resisting coating to articles of iron or steel.

One of the well known processes for applying a hard, corrosion resisting coating to articles of iron or steel is that of heating the metal in an atmosphere of ammonia. During the course of my experiments, I have discovered that the quality of the coating formed on the metal is much improved and that less time is required to form a coating of a given resistance to corrosion (as measured by the salt spray test) if the metal is heated in an atmosphere of ammonia containing a small percentage of sulphur or phosphorus instead of in an atmosphere of pure ammonia.

In treating articles of iron or steel by the process which I have discovered, I place the articles in a suitable stationary or rotary retort or furnace, heat the retort or furnace to a temperature varying from approximately 900° F. to approximately 1800° F., and slowly pass a current of ammonia carrying a small proportion (approximately one part in a thousand) of phosphorus or sulphur (in the elemental form or in the form of a compound from which the element will be freed at the temperature of the retort or furnace) through the furnace and over the articles to be treated. This operation is continued for the length of time necessary to give the desired depth of coating on the articles treated, after which the articles may either be removed from the retort or furnace and quenched in a suitable liquid, or allowed to cool slowly in the retort or furnace in the atmosphere of the gaseous mixture with which they have been treated. I have found that the coating formed by the ammonia-sulphur mixture is much more satisfactory than that formed by the ammonia-phosphorus mixture after quenching, and that the coating formed by the ammonia-phosphorus mixture is more satisfactory than that formed by the ammonia-sulphur mixture after slow cooling, and I, therefore, consider it preferable to treat articles which are to be quenched with the ammonia-sulphur mixture and articles which are to be slowly cooled with the ammonia phosphorus mixture.

As I have indicated, the sulphur or phosphorus carried by the ammonia gas may be in either the elemental form or in the form of a compound from which the elemental form will be freed at the temperature of the furnace or retort. I have, however, found it more satisfactory to introduce phosphorus into the ammonia gas in the elemental form, as this may be simply done by passing the ammonia gas over or through a mass of white or yellow phosphorus at ordinary room, or somewhat higher, temperatures. On the other hand, I have found it more satisfactory to introduce sulphur into the ammonia gas in the form of sulphur dioxide, as this may be simply done by passing the ammonia gas over or through a mass of a suitable sulphur compound, such, for instance, as ammonium sulphite, or ammonium bisulphite at ordinary room, or somewhat higher, temperatures. The methods, above described, of introducing the phosphorus or sulphur into the ammonia gas have, in addition to their simplicity, the advantage that, the amount of phosphorus or sulphur picked up by the ammonia gas during its passage through the mass of the element, or suitable compound thereof, may be easily regulated by controlling the temperature of the mass and/or the temperature of ammonia gas passing through the mass, and furthermore, that, under the conditions described, the amount of sulphur or phosphorus picked up by the ammonia gas, during its passage through the mass, is within the desired range.

Other methods of introducing the phosphorus or sulphur into the ammonia gas may be employed. For example, sulphur may be introduced into the ammonia gas from a suitable container or a generator in the form of a volatile compound, such as sulphur dioxide or hydrogen sulphide, from which the element will be freed at the temperature of the retort or furnace, and phosphorus may be introduced into the ammonia gas from a suitable container or a generator in the form of a volatile compound, such as phosphine, from which the element will be freed at the temperature of the retort or furnace.

The process, above described, while suitable for use in applying a corrosion resisting coating to all articles of iron or steel, I have found to be particularly suitable for use in applying such a coating to carbon steels and steels containing one or more of the following elements: nickel, chromium, vanadium, and manganese.

Experiments have proven that the resistance to corrosion (as measured by the salt spray test) of articles treated by my process is much more uniform than that of articles treated with pure ammonia gas and, furthermore, that by my process a coating of a given resistance to corrosion (as measured by the salt spray test) can be formed on an article of iron or steel in a much shorter time than by the use of pure ammonia. Moreover, I have found that, while articles treated with pure ammonia would rust if exposed to corrosive agents after being polished, articles treated by my process were rust-proof even after polishing.

The fact that the addition of such a very small amount of phosphorus or sulphur to the ammonia gas causes such a marked decrease in the time necessary to produce a coating of a given resistance to corrosion and such a marked increase in the uniformity and the quality of the coating produced, and the fact that a substantial increase in the amount of the sulphur or phosphorus does not, to any appreciable extent, work any further improvements in the process or the quality of the coating produced thereby would lead one to assume that the action of the sulphur or phosphorus is catalytic. However, the fact that the coating produced by my process is somewhat darker than that produced by pure ammonia gas seems to indicate that the coating contains some of the phosphorus or sulphur. There is also evidence that some, at least, of the phosphorus or sulphur (or the compound of phosphorus or sulphur) acts to remove oxygen and/or other impurities from the gases in the retort or furnace, and prevents oxidation of the articles being treated.

I have also found that the addition of sulphur or phosphorus to other gases such as illuminating gas, nitrogen, hydrogen, or a mixture of two or more of these gases, which are sometimes used in surface hardening steels increases the resistance to corrosion of the coating formed thereby.

I apprehend that the addition of other elements of Group V (B) or Group VI (B) of the periodic system, particularly arsenic, antimony, bisumth, selenium and tellurium to the ammonia or other gas should to some extent, at least, effect the desirable results enumerated and my experiments have proven that this is true of arsenic and antimony. However, I apprehend, and my experiments seen to indicate that the elements above mentioned are not as effective in producing the desired results as phosphorus and sulphur, and, furthermore, several practical objections to the use of any of them will be apparent.

I claim:
1. The process of treating iron or steel so as to produce on the surface thereof a corrosion resisting coating which includes heating the metal in an atmosphere of a gas capable of reacting with the metal so as to form thereon a surface coating and containing a substance selected from the group which consists of the elements of Group V (B) and Group VI (B) of the periodic system and the compounds of said elements from which the elements will be freed at the temperature of the heating.

2. The process of treating iron or steel so as to produce on the surface thereof a corrosion resisting coating which includes heating the metal in an atmosphere of a gas capable of reacting with the metal so as to form thereon a surface coating and containing a substance selected from the group which consists of phosphorus and sulphur, and the compounds of said elements from which the elements will be freed at the temperature of the heating.

3. The process of treating iron or steel so as to produce on the surface thereof a corrosion resisting coating which includes heating the metal in an atmosphere of ammonia containing a substance selected from the group which consists of the elements of Group V (B) and Group VI (B) of the periodic system and the compounds of said elements from which the elements will be freed at the temperature of the heating.

4. The process of treating iron or steel so as to produce on the surface thereof a corrosion resisting coating which includes heating the metal in an atmosphere of ammonia containing a substance selected from the group which consists of phosphorus and sulphur, and the compounds of said elements from which the elements will be freed at the temperature of the heating.

5. The process of treating iron or steel so as to produce on the surface thereof a corrosion resisting coating which includes subjecting the metal to an elevated temperature in an atmosphere of a gas capable of reacting with the metal so as to produce thereon a surface coating and containing a small proportion of a substance selected from the group which consists of the elements of Group V (B) and Group VI (B) of the periodic system.

6. The process of treating iron or steel so as to produce on the surface thereof a corrosion resisting coating which includes subjecting the metal to an elevated temperature in an atmosphere of a gas capable of reacting with the metal so as to form thereon a surface coating and containing a small proportion of a substance selected from the group which consists of phosphorus and sulphur.

7. The process of treating iron or steel so as to produce on the surface thereof a corrosion resisting coating which includes subjecting the metal to an elevated temperature in an atmosphere of ammonia containing a small proportion of a substance selected from the group which consists of the elements of Group V (B) and Group VI (B) of the periodic system.

8. The process of treating iron or steel so as to produce on the surface thereof a corrosion resisting coating which includes subjecting the metal to an elevated temperature in an atmosphere of ammonia containing a small proportion of a substance selected from the group which consists of phosphorus and sulphur.

9. The process of treating iron or steel so as to produce on the surface thereof a corrosion resisting coating which includes heating the metal to a point above red heat and below the melting point thereof in an atmosphere of a gas capable of reacting with the metal so as to form thereon a surface coating and containing a substance selected from the group which consists of the elements of Group V (B) and Group VI (B) of the periodic system and the compounds of said elements from which the elements will be freed at the temperature of the heating.

10. The process of treating iron or steel so as to produce on the surface thereof a corrosion resisting coating which includes heating the metal to a temperature between approximately 900° F and approximately 1800° F in an atmosphere of ammonia containing a substance selected from the group which consists of the elements of Group V (B) and Group VI (B) of the periodic system and the compounds of said elements from which the elements will be freed at the temperature of the heating.

11. The process of treating iron or steel so as to produce on the surface thereof a corrosion resisting coating which includes heating the metal in an atmosphere of a gas capable of reacting with the metal so as to form thereon a surface coating and containing a substance selected from the group which consists of phosphorus, sulphur, arsenic and antimony, and the compounds of said elements from which the elements will be freed at the temperature of the heating.

12. The process of treating iron or steel as to produce on the surface thereof a corrosion resisting coating which includes heating the metal in an atmosphere of ammonia containing a substance selected from the group which consists of phosphorous, sulphur, arsenic and antimony, and the compounds of said elements from which the elements will be freed at the temperature of the heating.

13. The process of treating iron or steel so as to produce on the surface thereof a corrosion resisting coating which includes subjecting the metal to an elevated temperature in an atmosphere of a gas capable of reacting with the metal so as to form thereon a surface coating and containing a small proportion of a substance selected from the group which consists of phosphorus, sulphur, arsenic and antimony.

14. The process of treating iron or steel so as to produce on the surface thereof a corrosion resisting coating which includes subjecting the metal to an elevated temperature in an atmosphere of ammonia containing a small proportion of a substance selected from the group which consists of phosphorus, sulphur, arsenic and antimony.

In testimony whereof I affix my signature.

ALFRED W. SCHLUCHTER.